United States Patent
Ashraf et al.

(10) Patent No.: US 11,118,387 B2
(45) Date of Patent: Sep. 14, 2021

(54) DOOR HINGE MECHANISM FOR A VEHICLE

(71) Applicant: Faraday & Future Inc., Gardena, CA (US)

(72) Inventors: Umran Ashraf, La Mesa, CA (US); Muhammad Faizan Zafar, Long Beach, CA (US); John Michael Colt, Pasadena, CA (US)

(73) Assignee: Faraday & Future Inc., Gardena, CA (US)

( * ) Notice: Subject to any disclaimer, the term of this patent is extended or adjusted under 35 U.S.C. 154(b) by 97 days.

(21) Appl. No.: 15/770,178

(22) PCT Filed: Oct. 20, 2016

(86) PCT No.: PCT/US2016/057812
§ 371 (c)(1),
(2) Date: Apr. 20, 2018

(87) PCT Pub. No.: WO2017/070285
PCT Pub. Date: Apr. 27, 2017

(65) Prior Publication Data
US 2018/0313122 A1 Nov. 1, 2018

Related U.S. Application Data

(60) Provisional application No. 62/244,723, filed on Oct. 21, 2015.

(51) Int. Cl.
*E05D 15/58* (2006.01)
*E05F 15/611* (2015.01)
(Continued)

(52) U.S. Cl.
CPC ............ *E05D 15/58* (2013.01); *B60J 5/0477* (2013.01); *E05D 3/02* (2013.01); *E05D 5/0207* (2013.01);
(Continued)

(58) Field of Classification Search
CPC .... E05D 15/58; E05D 2015/586; E06B 3/509
See application file for complete search history.

(56) References Cited

U.S. PATENT DOCUMENTS

| 116,686 A | * | 7/1871 | Covert | E05D 3/022 16/233 |
| 2,997,336 A | * | 8/1961 | Grant | B60J 5/0479 296/106 |

(Continued)

FOREIGN PATENT DOCUMENTS

| DE | 3528817 A1 * | 2/1987 | E05D 3/18 |
| DE | 10121401 A1 | 11/2002 | |

(Continued)

OTHER PUBLICATIONS

International Search Report dated Feb. 3, 2017 for International Application No. PCT/US2016/057812.

*Primary Examiner* — Catherine A Kelly
(74) *Attorney, Agent, or Firm* — Veros Legal Solutions, LLP (57) ABSTRACT

The present disclosure is directed to a door hinge mechanism for a vehicle. The door hinge mechanism may include a door configured to open and close relative to the frame, and a hinge secured to an interior of the door and an exterior of the frame. The hinge may be configured to open the door by sliding the door away from the frame and pivoting the door relative to the frame.

14 Claims, 6 Drawing Sheets

(51) Int. Cl.
*E05F 15/603* (2015.01)
*E05F 1/12* (2006.01)
*B60J 5/04* (2006.01)
*E05D 3/02* (2006.01)
*E05D 5/02* (2006.01)
*E05D 5/06* (2006.01)
*E05D 11/00* (2006.01)
*E06B 3/50* (2006.01)

(52) U.S. Cl.
CPC .............. *E05D 5/062* (2013.01); *E05D 11/00* (2013.01); *E05F 1/1223* (2013.01); *E05F 15/603* (2015.01); *E05F 15/611* (2015.01); *E06B 3/509* (2013.01); *E05Y 2201/638* (2013.01); *E05Y 2900/531* (2013.01)

(56) References Cited

U.S. PATENT DOCUMENTS

| | | | | |
|---|---|---|---|---|
| 3,791,073 A | * | 2/1974 | Baker | B64C 1/1407 49/249 |
| 4,945,677 A | * | 8/1990 | Kramer | B60J 5/06 296/155 |
| 5,040,857 A | * | 8/1991 | Mandel | E05D 3/022 16/364 |
| 5,244,247 A | * | 9/1993 | Kuwabara | B60J 5/047 16/365 |
| 5,255,876 A | * | 10/1993 | Fleming | B64C 1/1407 16/362 |
| 5,269,048 A | * | 12/1993 | Pazmany | B64C 1/1407 16/354 |
| 5,632,065 A | * | 5/1997 | Siladke | B60J 5/0479 16/335 |
| 6,305,737 B1 | * | 10/2001 | Corder | B60J 5/0479 296/146.11 |
| 6,318,824 B1 | * | 11/2001 | LaGrotta | E05D 3/022 312/322 |
| 6,959,972 B2 | * | 11/2005 | Cude | E05D 15/56 16/351 |
| 6,974,177 B2 | * | 12/2005 | Castillo | E05D 3/127 16/333 |
| 7,396,068 B1 | * | 7/2008 | McRobert | B60J 5/047 16/368 |
| 7,520,028 B2 | | 4/2009 | Borelis et al. | |
| 8,186,781 B2 | * | 5/2012 | Coleman | E05D 3/022 16/354 |
| 8,234,816 B2 | | 8/2012 | Heuel et al. | |
| 8,646,208 B2 | | 2/2014 | Taracko | |
| 9,676,256 B2 | * | 6/2017 | Elie | E05F 15/614 |
| 9,752,374 B2 | * | 9/2017 | Fu | E06B 3/509 |
| 9,810,009 B2 | * | 11/2017 | Balaz | B60J 5/0472 |
| 10,363,799 B2 | * | 7/2019 | Ma | E05D 3/127 |
| 10,384,519 B1 | * | 8/2019 | Brown | E05D 15/101 |
| 10,487,553 B2 | * | 11/2019 | Iacovoni | B60J 5/0479 |
| 2007/0245525 A1 | * | 10/2007 | Hoffman | E05F 15/611 16/367 |
| 2009/0295187 A1 | * | 12/2009 | Ham | E05D 3/022 296/146.11 |
| 2012/0049577 A1 | * | 3/2012 | Thomas | E05D 15/58 296/202 |

FOREIGN PATENT DOCUMENTS

| | | | | |
|---|---|---|---|---|
| DE | 202016004272 U1 | * | 8/2016 | ............ E05F 15/603 |
| EP | 0092692 A2 | | 11/1983 | |
| FR | 2621641 A1 | * | 4/1989 | ......... E05D 15/1081 |
| GB | 756873 A | * | 9/1956 | ............ E06B 3/509 |

* cited by examiner

DOOR HINGE MECHANISM FOR A VEHICLE

CROSS REFERENCE TO RELATED APPLICATIONS

This application is a National Phase application under 35 U.S.C. § 371 of International Application No. PCT/US2016/057812 filed on Oct. 20, 2016, which claims the benefit of priority from U.S. Provisional Patent Application No. 62/244,723 filed on Oct. 21, 2015, the entire disclosures of which is incorporated by reference.

TECHNICAL FIELD

The present disclosure relates generally to a door hinge mechanism for a vehicle, and more particularly, to a vehicle door hinge mechanism for improved control and aesthetics.

BACKGROUND

Vehicles require the synthesis of aesthetic design and functionality. The exterior of a vehicle is typically determined by the shapes and surfaces of the vehicle designed to enhance aerodynamics and aesthetic appeal. Designers are largely responsible for the arrangement and shapes of the windows, the doors, and the panels of the exterior of the vehicle. Recently, designers have been attempting to provide an especially sleek design by reducing the door seams and customizing the vehicle cut lines. The designers typically render the exterior design into a computer aided design (CAD) drawing, and engineers implement the drawing into a functioning vehicle.

Accordingly, engineers are responsible for determining how the vehicle design can be manufactured with structural components (e.g., door hinges) to ensure that the vehicle functions properly. Engineers are also responsible for providing features to the vehicle to optimize functionality and ensuring that the vehicle components provide structural and packaging feasibility. At times, it may be difficult to combine the demands of the design with the demands of the functionality.

The disclosed door hinge mechanism is directed to mitigating or overcoming one or more of the problems set forth above and/or other problem in the prior art.

SUMMARY

One aspect of the present disclosure is directed to a door hinge mechanism for a vehicle having a frame. The door hinge mechanism may include a door configured to open and close relative to the frame, and a hinge secured between an interior of the door and an exterior of the frame. The hinge may be configured to open the door by sliding the door away from the frame and pivoting the door relative to the frame.

Another aspect of the present disclosure is directed to a vehicle. The vehicle may include a frame and a door hinge mechanism. The door hinge mechanism may include a door configured to open and close relative to the frame, and a hinge secured between an interior of the door and an exterior of the frame. The hinge may be configured to open the door by sliding the door away from the exterior of the frame and pivoting the door relative to the exterior of the frame.

Yet another aspect of the present disclosure is directed to a method of opening a door of a vehicle having a frame using a door hinge mechanism. The method may include sliding the door away from the frame by rotating a first cross member of a hinge relative to a second cross member of the hinge, wherein the hinge is secured between an interior of the door and an exterior of the frame. The method may also include pivoting the door relative to the frame by rotating a pivoting plate around a lead screw of the hinge.

DETAILED DESCRIPTION

The disclosure is generally directed to a door hinge mechanism. In some embodiments, the door hinge mechanism may be applied to a rear door of a "French door" vehicle design. The contemplated hinge mechanism may provide improved mechanics that enable the door to slide outward from the vehicle prior to pivoting open. Advantageously, this mechanism may minimize or eliminate door gaps and allow cut lines to be customizable, while also eliminating clashes and improving ingress/egress. The mechanism may also provide fine-tuned control of the door while maintaining a compact design to facilitate packaging.

Figure 1:
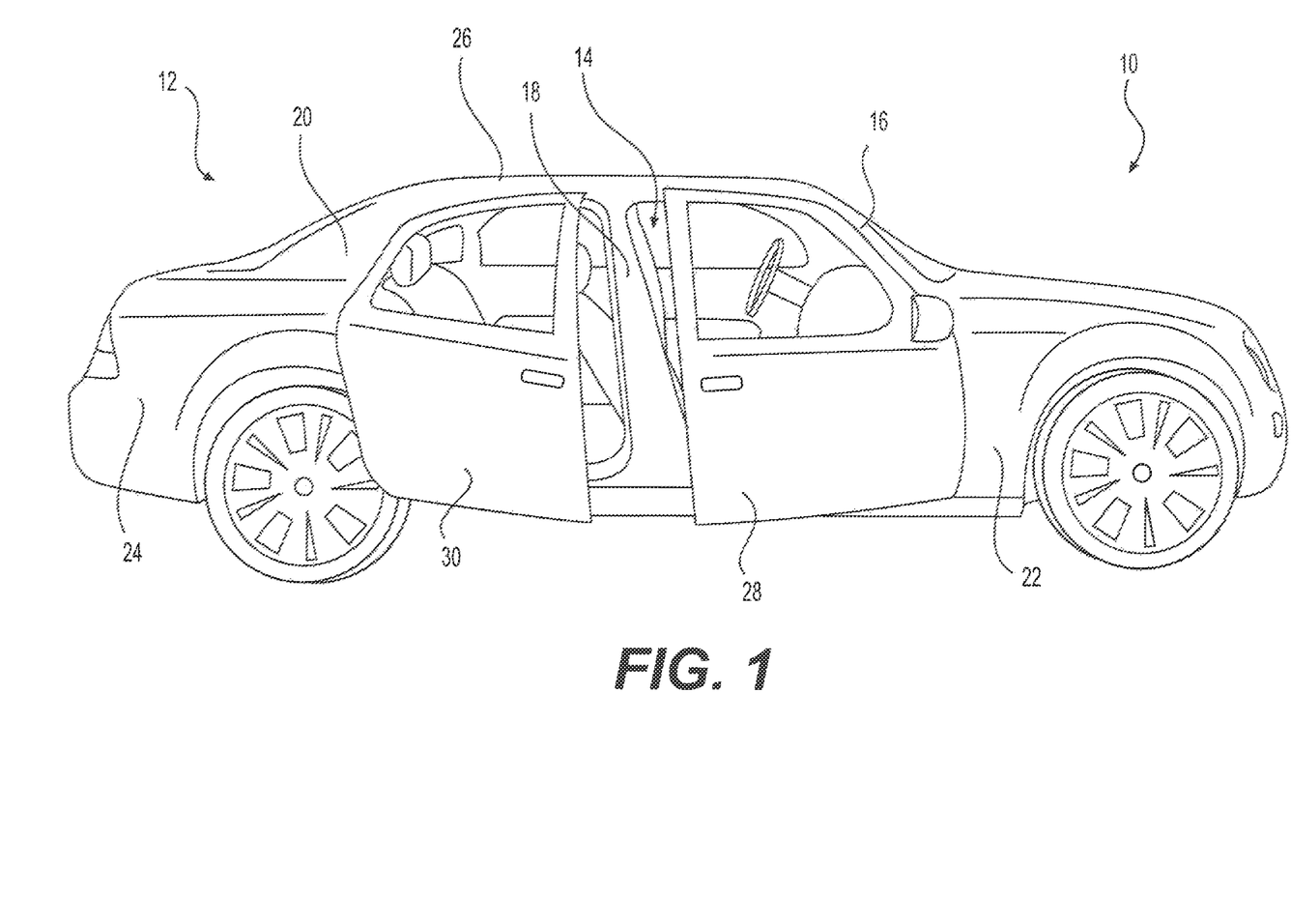
FIG. 1 is a diagrammatic illustration of an exemplary embodiment of the exterior of an exemplary vehicle.

FIG. 1 provides a diagrammatic illustration of an exemplary vehicle 10 according to an aspect of the disclosure. Vehicle 10 may have any body style, such as a sports car, a coupe, a sedan, a pick-up truck, a station wagon, a sports utility vehicle (SUV), a minivan, or a conversion van. Vehicle 10 may be an electric vehicle, a fuel cell vehicle, a hybrid vehicle, or a conventional internal combustion engine vehicle. Vehicle 10 may be configured to be operated by a driver occupying vehicle 10, remotely controlled, and/or autonomous. As illustrated in FIG. 1, vehicle 10 may include a cabin 14 configured to accommodate one or more passengers. Cabin 14 may be enclosed by a frame 12, which may include structural features, such as an A pillar 16, a B pillar 18, and a C pillar 20. Frame 12 may also include a front panel 22, a rear panel 24, and a roof 26.

Vehicle 12 may further include a front passenger door 28 and a rear passenger door 30 on each side of frame 12. In a closed configuration, front passenger door 28 may extend between A pillar 16 and B pillar 18, and rear passenger door 30 may extend between B pillar 18 and C pillar 20 in order to substantially enclose cabin 14. Doors 28, 30 may also be configured to open in order to allow ingress/egress of passengers from cabin 14. Doors 28, 30 may be opened and closed by any number of mechanisms. For example, in some embodiments, doors 28, 30 may include a door latch that is manually disabled with the actuation of a door handle. In some embodiments, doors 28, 30 may be automatically opened via one or more motors that may be actuated by a number of different inputs. In some embodiments, as depicted in FIG. 1, doors 28, 30 may be opened in a "French door" style, such that front passenger door 28 and rear passenger door 30 may open in opposite directions of each other. The "French door" style may provide a number of advantages including improved ingress/egress and aesthetics. Although depicted to be immediately adjacent to each other when closed, doors 28, 30 may be separated in the closed configuration by a center panel (not shown) positioned on an exterior surface of B pillar 18.

Figure 2A:
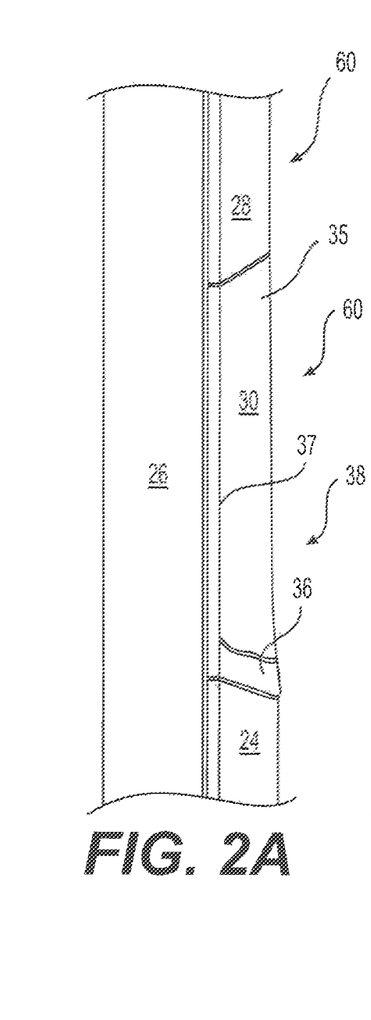
FIGS. 2A-2C are diagrammatic overhead illustrations of an exemplary embodiment of a door of the exemplary vehicle of FIG. 1.
Figure 2B:
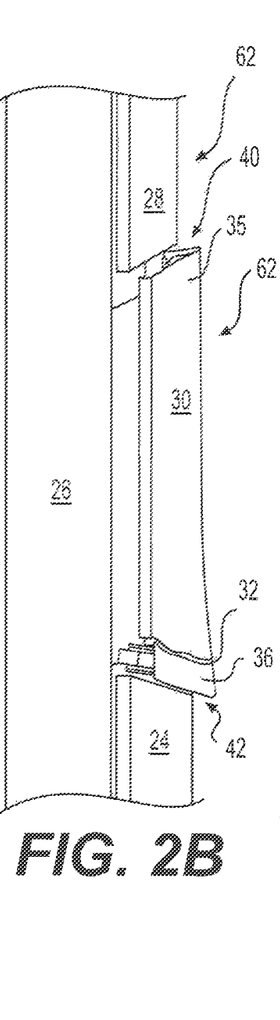
Figure 2C:
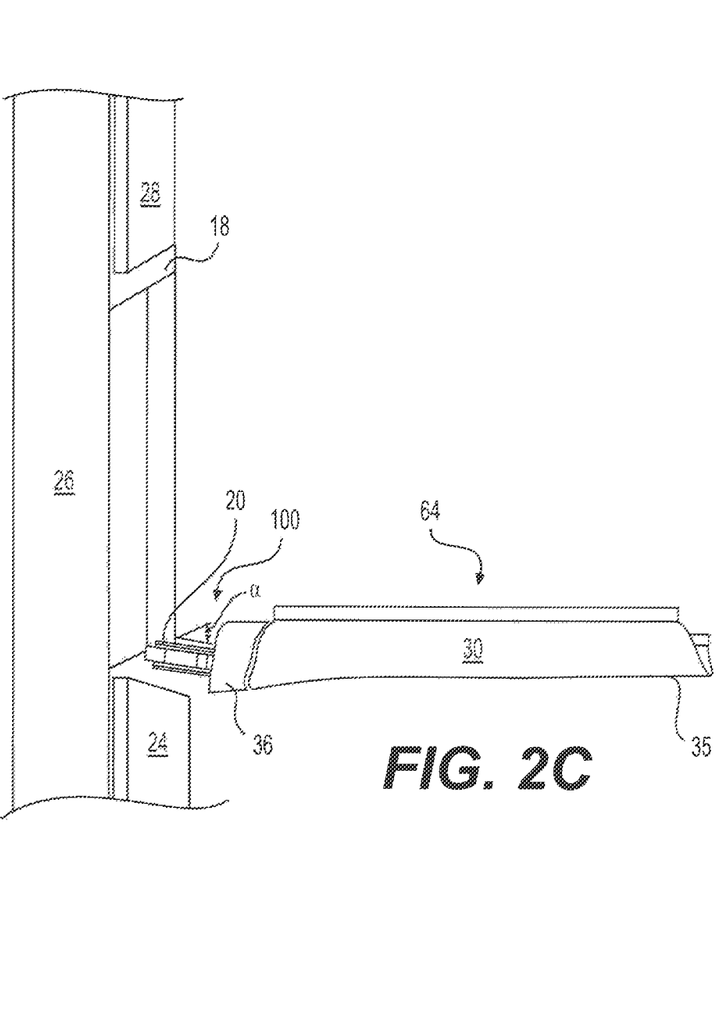

FIGS. 2A-2C provide diagrammatic overhead illustrations of an exemplary embodiment of door 30 of exemplary vehicle 10 of FIG. 1. Door 30 may include a fore end 35, an aft end 36, a top end 37, and a bottom end 38. As illustrated in FIGS. 2A-2C, a hinge 100 may extend between an interior surface of aft end of door 30 and an exterior surface of frame 12 (e.g., at C pillar 20). Hinge 100 may be configured to transition door 30 from a closed configuration 60 as depicted in FIG. 2A, to an intermediate configuration 62 as depicted in FIG. 2B, and to an open configuration 64 as depicted in FIG. 2C.

In closed configuration 60, rear passenger door 30 may extend between B pillar 18 and C pillar 20 with a minimal seam (or absence thereof) between adjacent components. For example, in some embodiments, door 30 may have closed configuration 60, wherein one or more ends of door 30 may abut an end of adjacent components (e.g., front passenger door 28, rear panel 24, or a center panel separating doors 28, 30). In some embodiments, door 30 may create a seam as small as about 1-10 millimeters between adjacent components. Advantageously, the mechanics of hinge 100 may allow doors 28, 30 to open/close, simultaneously or separately, without adjacent components overlapping (e.g., clashing). This may be facilitated by door 30 (as it transitions from closed configuration 60 to intermediate configuration 62) separating from front passenger door 28 to form a first gap 40 and from rear panel 24 to form a second gap 42.

In some embodiments, door 30 may open/close in one or more phases. For example, as depicted in FIGS. 2A and 2B, rear passenger door 30 may be configured to slide substantially transverse from frame 12 in a first phase to intermediate configuration 62, while remaining substantially parallel to frame 12. In some embodiments, door 30 may slide at a substantially 90° angle from an exterior surface of frame 12 in the first phase. However, in other embodiments, hinge 100 may be secured to frame 12 (e.g., at C pillar 20) at an acute angle, α, to slide door 30 simultaneously transverse and aft relative to frame 12, as depicted in FIGS. 2A-2C. Acute angle, α, may be in the range of about 5° to about 15° (e.g., about 10°) relative to a transverse axis of frame 12. The configuration of acute angle, α, may provide additional clearance (e.g., gap 40) from front passenger door 28 in intermediate configuration 62.

In intermediate configuration 62, gaps 40, 42 may be sufficiently large in order to allow door 30 to transition into a second phase. For example, as depicted in FIGS. 2B and 2C, door 30 may be configured to pivot from intermediate configuration 62 to open configuration 64. In some embodiments, aft end 36 may be configured to translate further away from frame 12, while door 30 is pivoting. In some embodiments, gaps 40, 42 may be sufficiently large to allow rear passenger door 30 to open in a substantially 90° range of motion to open configuration 64. This increased range of motion may enlarge the doorway for ingress/egress of passengers.

Door 30 may also include a cutline 32 positioned between fore end 35 and aft end 36. Cutline 32 may extend through an exterior surface and an interior surface of door 30. Cutline 32 may also extend between top end 37 and bottom end 38, for example, the entire vertical length of door 30. Since gaps 40, 42 may be minimized or eliminated in closed configuration 60, cutline 32 may aesthetically replace the seam between the components (e.g., gaps 40, 42). Cutline 32 may be placed anywhere along the width of door 30 and in any configuration. For example, cutline 32 may be positioned in a vertical configuration on door 30 and positioned at least 85 millimeters from ends 35, 36. Cutline 32 may also have other configurations to provide unique aesthetics. For example, outline 32 may include a zig-zag, sinusoidal, or arcuate configuration along door 30.

Figure 3A:
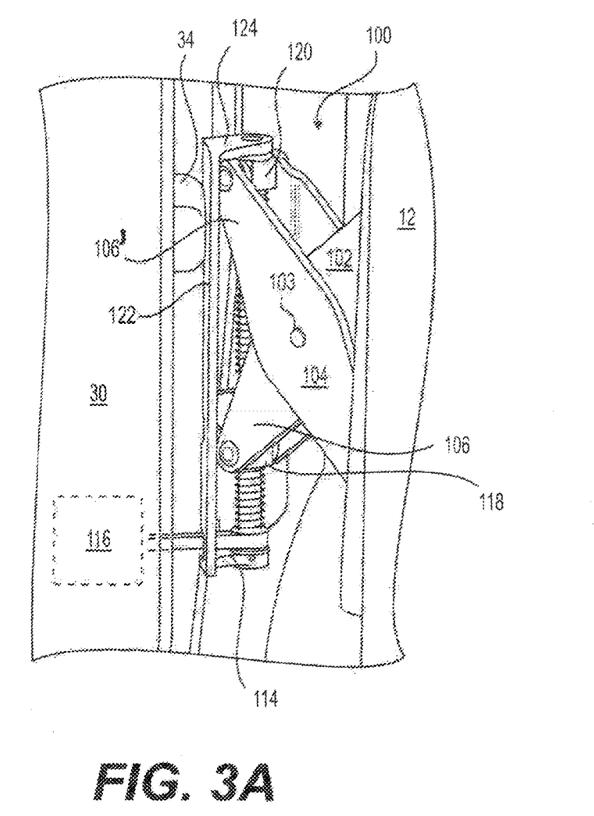
FIGS. 3A and 3B are diagrammatic interior illustrations of an exemplary embodiment of a door hinge of the exemplary vehicle of FIG. 2.
Figure 3B:
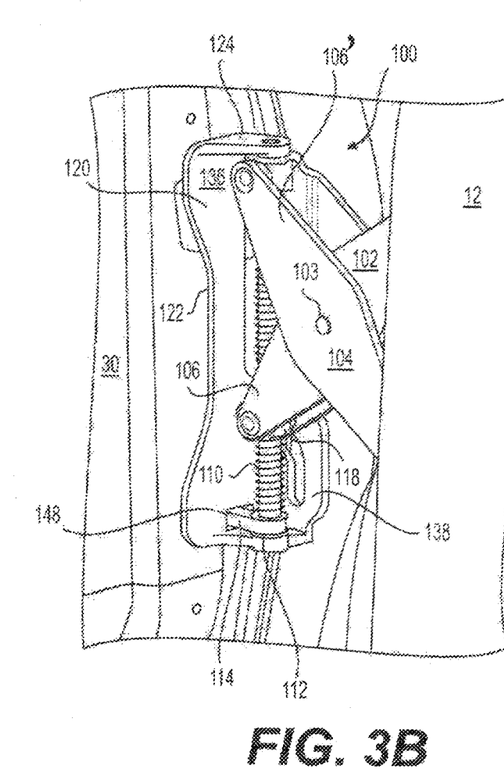

FIGS. 3A-3B provide a diagrammatic interior illustration of exemplary hinge 100 of exemplary vehicle 10 of FIG. 1. Hinge 100 may include first and second cross members 102, 104 extending between a lead screw 110 secured to door 30 and a support 128 (depicted in FIGS. 4A-4C) secured to frame 12. Lead screw 110 may also include a pulley 112 that is secured to a belt 114, which is driven by a motor 116. Hinge 100 may further include a pivoting plate 122 positioned between lead screw 110 and door 30. FIGS. 3A-3B also illustrate an interior surface of door 30 having a protruding portion 34 extending laterally therefrom. FIG. 3A depicts door 30 in the second phase as it is pivoting open (e.g., as illustrated between FIGS. 2B-2C) and FIG. 3B depicts door in an open configuration (e.g., as illustrated in FIG. 2C).

Figures 5A, 5B, 5C:
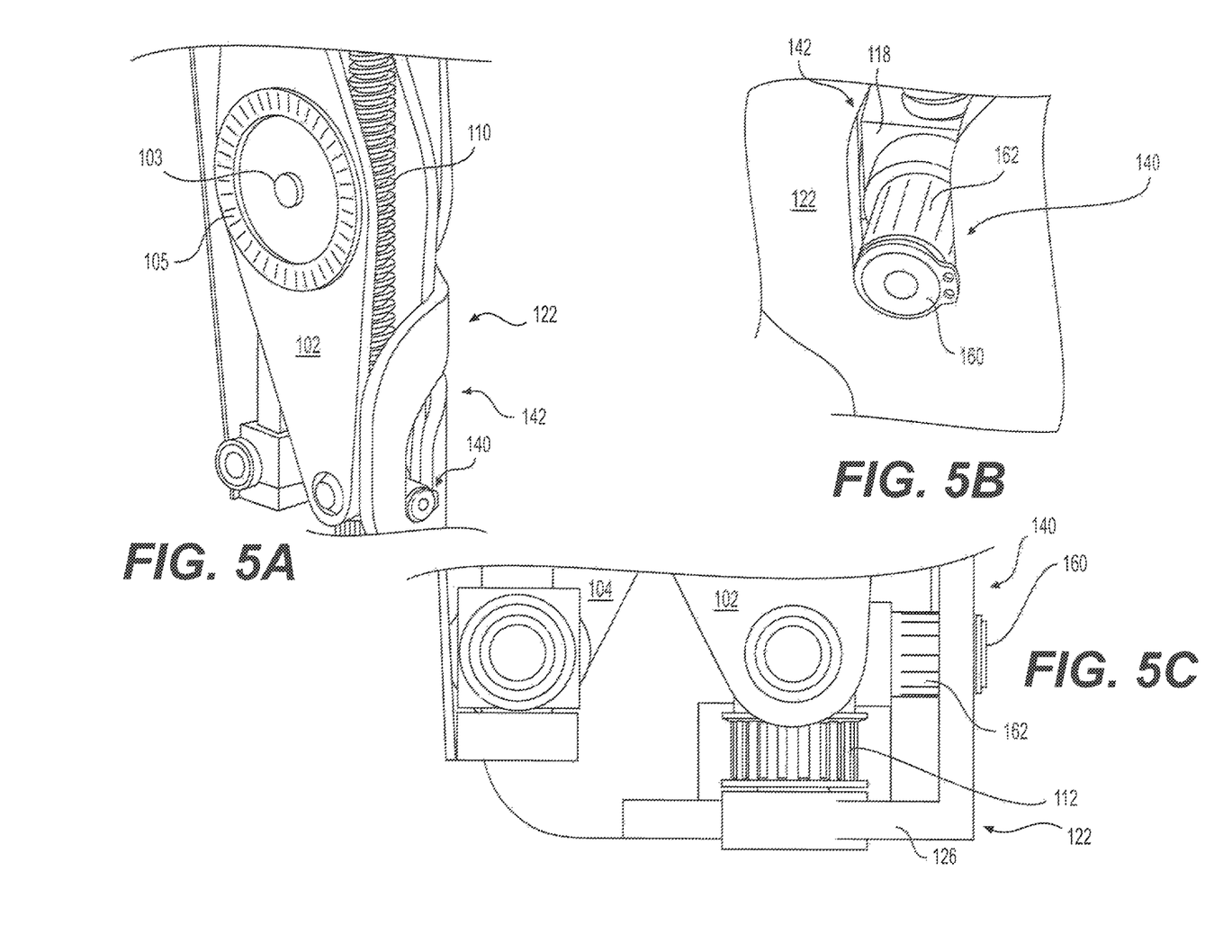
FIGS. 5A-5C are further diagrammatic illustrations of the exemplary hinge of the exemplary vehicle of FIG. 2.

First and second cross members 102, 104 may extend between frame 12 and door 30. First and second cross members 102, 104 may be embodied as two pairs of plates on each side of hinge 100. Each pair of plates may be mirrored relative to a central plane of hinge 100. First and second cross members 102, 104 may be configured to rotate about a central pivot point 103 in order to expand and contract hinge 100, for example, in a scissoring mechanism. Central pivot point 103 may be embodied as a pin that secures first and second cross members 80, 82 together in a pivoting configuration. First and second cross members 102, 104 may also be secured together with a truss bearing 105 (e.g., as depicted in FIG. 5A) which facilitates relative rotational movement, prevents bending, and increases the stiffness of hinge 100 between first and second cross members 102, 104.

First and second cross members 102, 104 may each include a first end 106, 106' secured to lead screw 110. For example, first end 106 of first member 102 may be pivotably attached to a traveler 118 that is configured to translate along lead screw 110. Traveler 118 may include a threaded interior that mates with exterior threads of lead screw 110, such that rotational movement of lead screw 110 is converted to translational movement of traveler 118 along lead screw 110. First end 106' of second member 102 may be pivotably attached to a fixed member 120 of lead screw 110. Therefore, as traveler 118 translates along lead screw 110, hinge 100 may expand/contract, thus opening/closing door 30. The pitch of each of lead screw 110 and traveler 114 may allow fine-tuned control of door 30 along its entire range of motion. For example, due to the threaded configuration of lead screw 110 and traveler 118, door 30 may be readily stopped at any position between closed configuration 60 (e.g., illustrated in FIG. 2A) and open configuration 64 (e.g., illustrated in FIG. 2C) without any substantial oscillations.

In addition to expanding and contracting hinge 100, relative rotational movement of first and second members 102, 104 may be configured to actuate pivoting plate 122. The actuation of pivoting plate 122 may include rotation around lead screw 110 in order to pivot door 30 open/closed. For example, pivoting plate 122 may include a top surface 124 rotatably secured to a top surface of lead screw 110, and a bottom surface 126 rotatably secured to a bottom surface of lead screw 110. Pivoting plate 122 may also include a flat surface 136 fixed to a lateral interior surface of door 30. For example, an upper portion of flat surface 136 may be fixed to a protruding portion 34 extending laterally on door 30 via bolts through mounting holes. Pivoting plate 122 may also include an arcuate surface 138 that includes a slot 142. As hinge 100 expands and contracts, pivoting plate 122 may be configured to selectively maintain a lateral configuration as door 30 slides substantially transverse to frame 12 during a first phase of motion (e.g., as illustrated in FIGS. 2A and 2B). Pivoting plate 122 may also be configured to pivot door 30 opera/closed during a second phase of motion (e.g., as illustrated in FIGS. 2B and 2C). Pivoting plate 122 may further include a belt slot 148 that accommodates belt 114. Belt slot 148 may be aligned with an opening (not shown) on an interior surface of door 30, which feeds belt 114 to motor 116.

Motor 116 may be positioned inside door 30 and configured to actuate belt 114 in order to rotate lead screw 110, via pulley 112. Motor 116 may include a driving pulley (not shown) which provides a rotational force to belt 114, which in turn rotates pulley 112. Motor 116 may be hydraulically or rotary driven and may be controlled by command signals from a variety of different mechanisms. For example, motor 116 may be controlled by wired or wireless command signals generated by an interface or handle (not shown) positioned on an interior and/or exterior surface of door 30. Motor 116 may also be controlled by command signals generated, for example, by other components within cabin 14 and/or from a remote radiofrequency fob (not shown).

Figures 4A, 4B:
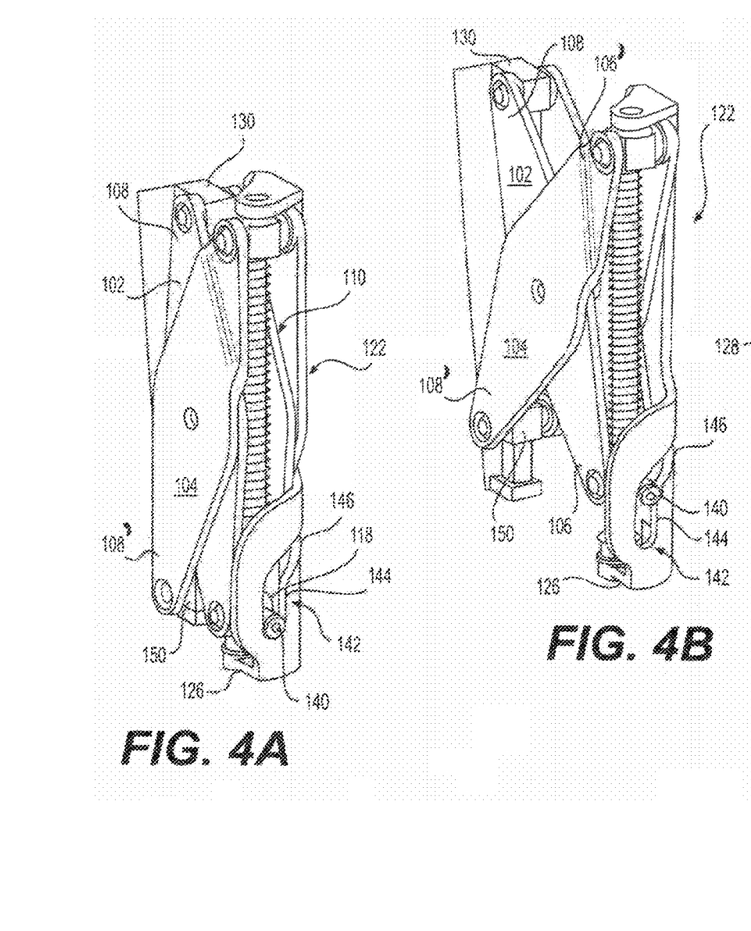
FIGS. 4A-4C are additional diagrammatic illustrations of the exemplary hinge of the exemplary vehicle of FIG. 2
Figure 4C:
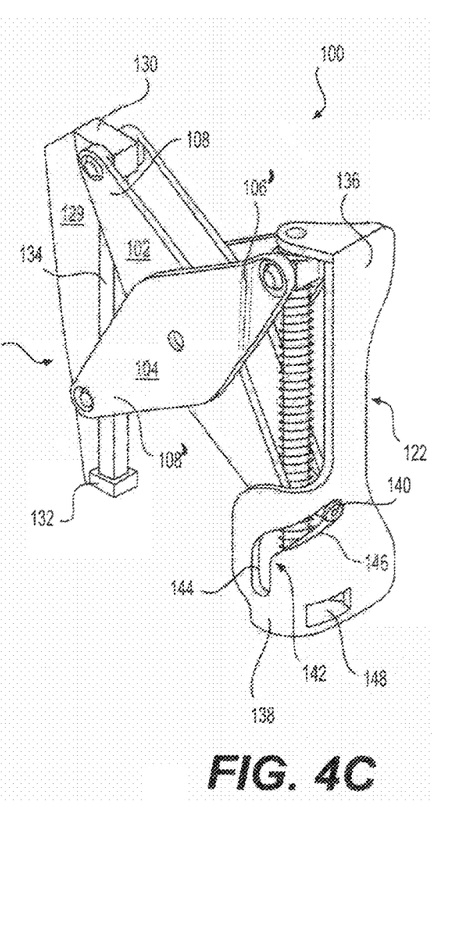

FIGS. 4A-4C provide a diagrammatic illustration of an exemplary hinge 100 of exemplary vehicle 10 of FIG. 1. As illustrated in FIGS. 4A-4C, hinge 100 may be actuated in first and second phases, corresponding to the first and second phases of door 30 of FIGS. 2A-2C. For example, hinge 100 may include a contracted configuration 80 as depicted in FIG. 4A, an intermediate configuration 82 as depicted in FIG. 4B, and an expanded configuration 84 as depicted in FIG. 4C. Hinge 100 may be secured to a lateral inside surface of door 30, such that rotation of pivoting plate 122 may pivot door 30 open/closed.

As further illustrated in FIGS. 4A-4C, the first and second phases may be enabled by the interaction of a cam 140 positioned on traveler 118 and a slot 142 in pivoting plate 122. For example, slot 142 may include a first segment 144 in a substantially vertical direction and substantially parallel to lead screw 110, and a second segment 146 in a substantially lateral direction. Therefore, in the first phase as illustrated in FIGS. 2A and 2B, cam 140 may travel along first segment 144 and substantially flat surface 136 remains substantially parallel to the expansion of hinge 100. However, in the second phase as illustrated in FIGS. 2B and 2C, cam 140 may translate along second segment 146, which causes pivoting plate 122 to rotate and door 30 to pivot. Pivoting plate 122 may pivot substantially 90° around lead screw 110 to effectuate opening/closing of door 30.

Second ends 108, 108' of first and second cross member 102, 104 may be secured to support 128. For example, second end 108 of first cross member 102 may be pivotably secured to fixed member 130 of support member 128, while second end 108' of second cross member 102 may be secured to a collar 150. Collar 150 may be configured to slide along a pin 134 which extends between a stop 132 and fixed member 130. This configuration may facilitate hinge 100 to expand/contract by relative rotation of first and second cross members 102, 104, for example, in a scissoring mechanism. Support 128 may also include a support plate 129 secured to an exterior surface of frame 12.

FIGS. 5A-5C provide additional diagrammatic illustrations of exemplary hinge 100 of exemplary vehicle 10 of FIG. 1. FIG. 5A provides an illustration of hinge 100 with second cross member 104 removed to illustrate a truss bearing 105, which is positioned between first and second cross members 102, 104. Truss bearing 105 may include two planar surfaces separated by ball bearings, which facilitates relative rotational movement, prevents bending, and increases the stiffness of hinge 100 between first and second cross members 102, 104. For example, the planar surfaces of truss bearing 105 provides torsional stiffness by reinforcing first and second cross members 102, 104. The ball bearings of truss bearing 105 facilitate relative rotational movement between first and second cross members 102, 104 by providing a low friction interface between the planar surfaces.

FIGS. 5B and 5C provide an exemplary illustration of cam 140, which may include a pin 160 supporting a roller bearing 162. Roller bearing 162 may be configured to provide high load capacity, reduce friction, and provide dynamic load bearing as pin 160 translates along slot 142. Roller bearing 162 may include a needle roller bearing including small cylindrical rollers that allow for rotational movement around pin 160. Slot 142 may also include a coating to improve hardness and reduce frictional interface. For example, slot 142 may include a solid coating (e.g., KAron V) to improve slot hardness and provide a low friction interface. Therefore, roller bearing 162 and/or the solid coating may facilitate translation of pin 160 along slot 142, as traveler 115 translates along lead screw 110.

FIG. 5C also provides an exemplary illustration of pulley 112. Pulley 112 may include a grooved outer diameter, which interlocks with an inner surface of belt 114 (not shown). Pulley 112 may be configured to be rotated by belt 114 around a longitudinal axis in order to rotate lead screw 110 and translate traveler 118. However, it is contemplated that pulley 112 may be rotated in other manners, such as by a motor internal to pulley 112.

Figure 6A:
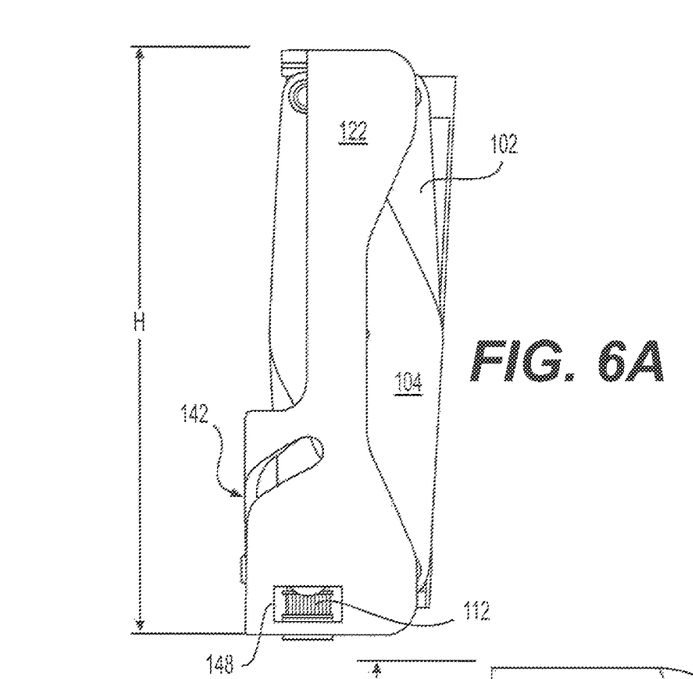
FIGS. 6A-6C are even further diagrammatic illustrations of the exemplary hinge of the exemplary vehicle of FIG. 2.
Figure 6B:
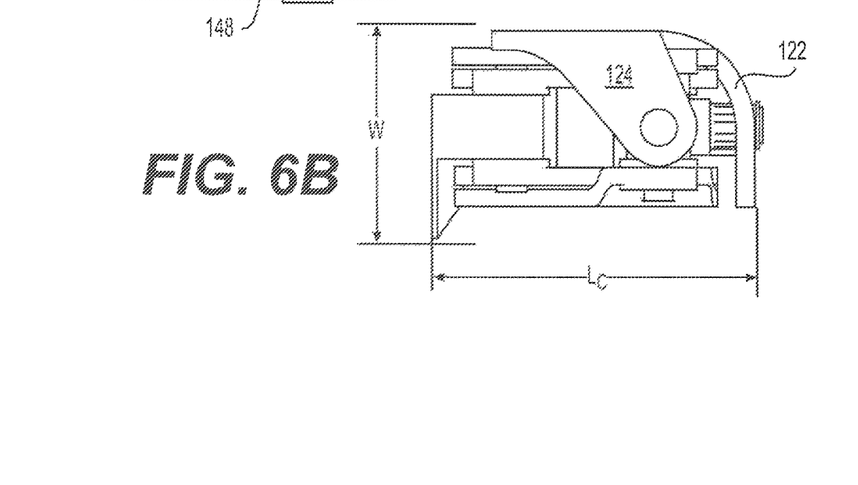
Figure 6C:
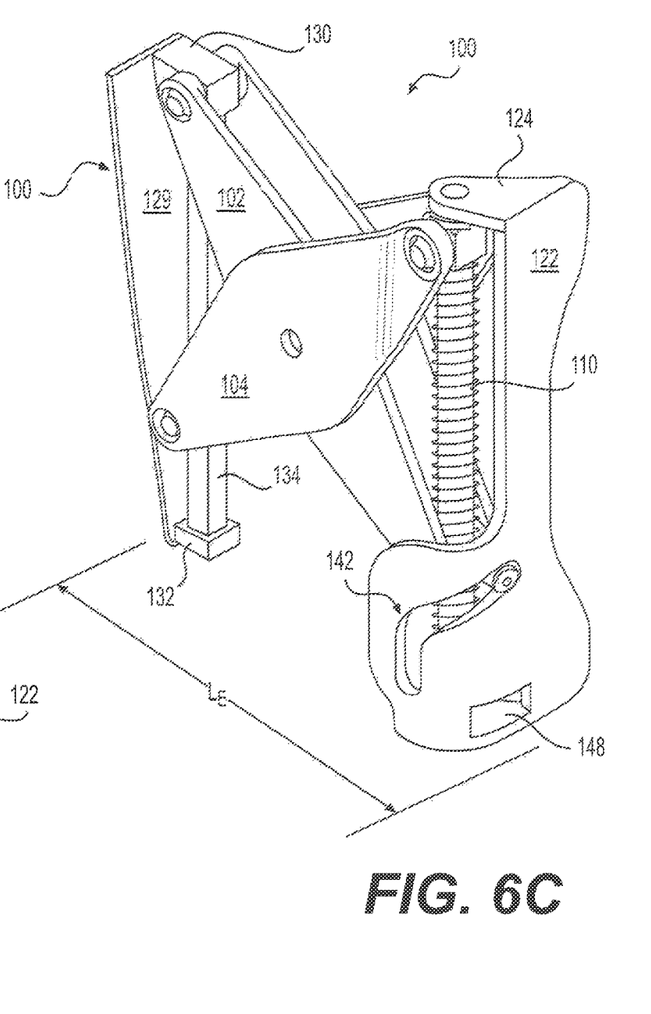

FIGS. 6A-6C provide additional diagrammatic illustrations of exemplary hinge 100 of exemplary vehicle 10 of FIG. 1. As depicted in FIGS. 6A-6C, hinge 100 may provide an especially compact design to improve the packaging of the components. The dimensions of hinge 100 may also provide a compact shape that favorably fits between exterior of frame 12 and interior of door 30. In some embodiments, as depicted in the side view of FIG. 6A, hinge 100 may have a height, H, of about 350 millimeters. As depicted in the top view of FIG. 6B, hinge 100 may have a width, W, of about 70 millimeters and a compressed length, Lc, of about 113 millimeters. In some embodiments, as depicted in the oblique view of FIG. 6C, hinge 100 may have an expanded length, $L_E$, of about 250 millimeters. Components of hinge 100 may be composed of steel to provide favorable stiffness.

Even though the mechanics of hinge 100 are discussed in relation to opening/closing rear passenger door 30, hinge 100 may, additionally or alternatively, be applied to front passenger door 28 or any other door of vehicle 10. For example, hinge 100 may secure front passenger door 28 to A pillar 16. Hinge 100 may open/close in similar first and second phases and open front passenger door 28 in a substantially 90° range of motion relative to frame 12. Hinge 100 may be configured to remove gaps 40, 42 between front passenger door 28 and adjacent components, as discussed herein.

It will be apparent to those skilled in the art that various modifications and variations can be made to the disclosed door hinge mechanism. Other embodiments will be apparent to those skilled in the art from consideration of the specification and practice of the disclosed door hinge mechanism. It is intended that the specification and examples be considered as exemplary only, with a true scope being indicated by the following claims and their equivalents.

What is claimed is:

1. A door hinge mechanism for a vehicle having a frame, the door hinge mechanism comprising:
    a door configured to open and close relative to the frame; and
    a hinge secured between an interior of the door and an exterior of the frame, wherein the hinge is configured to open the door by sliding the door away from the frame and pivoting the door relative to the frame,
    wherein the hinge includes:
        a support secured to the frame;
        a lead screw secured to the door;
        a first cross member having a first end secured to the lead screw and a second end secured to the support; and
        a second cross member having a first end secured to the lead screw and a second end secured to the support; and
    wherein the door hinge mechanism further comprises: a pulley secured to the lead screw; and a belt positioned around the pulley and configured to rotate the lead screw to expand and contract the hinge.

2. The door hinge mechanism of claim 1, wherein the hinge is configured to open the door by sliding the door substantially transverse to the frame.

3. The door hinge mechanism of claim 2, wherein the hinge is secured to the frame at an acute angle relative to a perpendicular axis of the frame, such that the door is configured to slide substantially aft with respect to the frame.

4. The door hinge mechanism of claim 1, wherein the hinge includes: a truss bearing situated between the first cross member and the second cross member.

5. The door hinge mechanism of claim 1, wherein the hinge includes:
    a traveler secured to the first end of the first cross member and positioned around the lead screw; and
    a collar secured to the second end of the second cross member and positioned around the support, wherein the traveler is configured to translate along the lead screw, and the collar is configured to translate along the support.

6. The door hinge mechanism of claim 1, wherein the hinge further includes a pivoting plate secured between the lead screw and the interior of the door.

7. The door hinge mechanism of claim 6, wherein the pivoting plate is configured to pivot substantially 90 degrees about the lead screw to pivot the door.

8. The door hinge mechanism of claim 6, further including: a slot positioned on the pivoting plate, wherein the slot includes a substantially vertical segment and a substantially lateral segment; and a cam extending through the slot.

9. The door hinge mechanism of claim 8, wherein the cam includes: a pin extending through the slot; and a roller bearing positioned on the pin.

10. The door hinge mechanism of claim 1, wherein the door includes: a first door end; a second door end; an interior surface; an exterior surface; and a cutline positioned between the first door end and the second door end, wherein the cutline extends through the interior surface and the exterior surface.

11. The door hinge mechanism of claim 1, wherein the door is a rear passenger door.

12. A vehicle, comprising
    a frame; and
    a door hinge mechanism including:
    a door configured to open and close relative to the frame; and a hinge secured between an interior of the door and an exterior of the frame, wherein the hinge is configured to open the door by sliding the door away from the exterior of the frame and pivoting the door relative to the exterior of the frame;
    wherein the hinge is configured to open the door by sliding the door substantially transverse to the frame;
    wherein the hinge is secured to the frame at an acute angle relative to a perpendicular axis of the frame, such that the door is configured to slide substantially aft with respect to the frame; and
    wherein the vehicle further comprises:
        a slot positioned on a pivoting plate, wherein the slot includes a substantially vertical segment and a substantially lateral segment; and
        a cam extending through the slot.

13. The vehicle of claim 12, wherein the hinge includes a support secured to the frame;
    a lead screw secured to the door;
    a first cross member having a first end secured to the lead screw and a second end secured to the support; and
    a second cross member having a first end secured to the lead screw and a second end secured to the support.

14. The vehicle of claim 13, wherein the hinge further includes the pivoting plate secured between the lead screw and the interior of the door.

* * * * *